UNITED STATES PATENT OFFICE 2,678,933

STEROIDS

Peter D. Meister, Kalamazoo Township, Kalamazoo County, Mich., assignor to The Upjohn Company, Kalamazoo, Mich., a corporation of Michigan No Drawing. Application January 15, 1953, Serial No. 331,501

4 Claims. (Cl. 260—397.45)

The present invention relates to steroids of the androstane and 10-normethylandrostane series and is more particularly concerned with 11-keto-17α-methyltestosterone, 10-normethyl-11-keto-17α-methyltestosterone, and with a process for the production thereof.

The process and the product of the present invention may be illustratively represented by the following formulae:

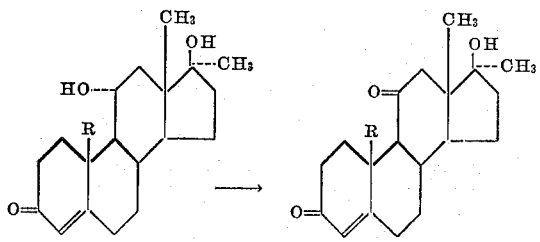

wherein R is hydrogen or methyl.

The process of the present invention consists in oxidizing 11α-hydroxy-17α-methyltestosterone or 10-normethyl-11α-hydroxy-17α-methyltestosterone with chromic acid to obtain the corresponding 11-keto-17α-methyltestosterone or 10-normethyl-11-keto-17α-methyltestosterone.

It is an object of the present invention to provide 11-keto-17α-methyltestosterone and 10-normethyl-11 - keto - 17α - methyltestosterone. Another object of the present invention is the provision of a process for the production of 11-keto-17α-methyltestosterone and 10-normethyl-11-keto-17α-methyltestosterone. Other objects of the invention will be apparent to one skilled in the art to which this invention pertains.

11-keto-17α-methyltestosterone as well as 10-normethyl-11-keto-17α-methyltestosterone have been found to possess hormonal adrenocorticoid activity. They also demonstrate anesthetic, anabolic, inhibitory luteoid, spermatogenic and testoid activity. Dehydration of 11-keto-17α-methyltestosterone or 10-normethyl-11-keto-17α-methyltestosterone with phosphorus oxychloride or hydrogen chloride in acetic acid yields 17-methylene-4-androstene-3,11-dione or 10-normethyl - 17 - methylene - 4 - androstene-3,11-dione which by oxidation with ozone furnishes adrenosterone (4 - androstene - 3,11,17-trione) or 4-estrene-3,11,20-trione (10-normethyladrenosterone) having androgenic hormone activity.

The starting compounds of this invention, i. e., 11α-hydroxy-17α-methyltestosterone and 10-normethyl-11α-hydroxy-17α - methyltestosterone are prepared by oxygenation of 17α-methyltestosterone and 10 - normethyl - 17α - methyltestosterone, respectively, as shown in Preparations 1 and 2.

In carrying out the process of the present invention, the 11α-hydroxy-17α-methyltestosterone or 10-normethyl-11α-hydroxy-17α-methyltestosterone, dissolved in an organic solvent such as acetic acid, benzene, toluene, petroleum ether, hexanes (Skelly-solve A), or similar solvents, with acetic acid preferred, is oxidized with a solution containing chromic acid. The chromic acid may be added as chromic acid anhydride ($CrO_3$) together with a small but sufficient amount of water to produce the dichromate ion ($Cr_2O_7^{--}$) or may be produced in situ by the reaction between an alkali metal dichromate such as sodium or potassium dichromate and an acid, for example, acetic acid, formic acid, or sulfuric acid. The reaction may be carried out in a heterogeneous or a homogeneous system. If the reaction is carried out in a heterogeneous system, the 11α-hydroxy-17α-methyltestosterone or the 10 - normethyl - 11α - hydroxy - 17α - methyltestosterone, dissolved in an organic solvent which is inert to oxidation under the reaction conditions, such as benzene, chlorobenzene, hexane, chloroform, or a similar solvent, is admixed with a solution of aqueous sodium dichromate or potassium dichromate acidified with sulfuric acid or sulfuric acid combined with acetic acid. Vigorous agitation is then employed to bring the organic layer into intimate contact with the aqueous solution. The reaction time is mainly dependent on efficient stirring. In the preferred embodiment of the invention the oxidation is carried out in homogeneous solution, with acetic acid as solvent and chromic acid as oxidizing agent, the chromic acid being produced by the reaction of small amounts of water with chromic anhydride.

At the termination of the reaction, excess chromic acid is destroyed by adding methyl or ethyl alcohol to the solution and concentrating the solution on a steam bath in vacuo. The temperature of reaction is between about zero and about fifty degrees centigrade, with temperatures between about fifteen and thirty degrees centigrade preferred. The reaction time depends on the temperature and may vary between about one-half hour to about ten hours or even longer. At room temperature, i. e., at about 25 degrees centigrade, the reaction time is usually between about three and eight hours. The thus-obtained solid 11-keto-17α-methyltestosterone or 10-normethyl-11-keto-17α-methyltestosterone may be purified by recrystallization, if desired.

The following examples illustrate the process of the present invention but are not to be construed as limiting.

PREPARATION 1.—11α-HYDROXY-17α-METHYLTESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.7 after sterilization. Three liters of this sterilized medium was inoculated with *Rhizopus nigricans* minus strain, American Type Culture Collection Number 6227b, and incubated for 24 hours at a temperature of 28 degrees centigrade using a rate of aeration and agitation such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added 1.48 grams of 17α-methyltestosterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The remaining solids, obtained upon evaporation of the methylene chloride solvent, weighed 3.3407 grams.

1.095 grams of the solvent-free extractives were dissolved in 110 milliliters of benzene and chromatographed over a column containing 55 grams of alumina which had been washed with hydrochloric acid, then washed with water, and dried for four hours at 120 degrees centigrade. Developing solvents were used in 110-milliliter portions as indicated in the accompanying table.

TABLE

| Fraction | Solvent | Eluate Solids, Milligrams |
|---|---|---|
| 1 | benzene | 13.2 |
| 2 | benzene-ether 9:1 | 11.7 |
| 3 | do | 62.1 |
| 4 | benzene-ether 1:1 | 10.1 |
| 5 | do | 5.5 |
| 6 | ether | 4.0 |
| 7 | do | 4.7 |
| 8 | do | 4.1 |
| 9 | ether-chloroform 19:1 | 6.0 |
| 10 | do | 4.1 |
| 11 | do | 4.8 |
| 12 | ether-chloroform 9:1 | 5.4 |
| 13 | do | 5.9 |
| 14 | do | 4.2 |
| 15 | ether-chloroform 1:1 | 3.8 |
| 16 | do | 11.0 |
| 17 | do | 8.0 |
| 18 | chloroform | 4.2 |
| 19 | do | 113.8 |
| 20 | do | 67.0 |
| 21 | chloroform-acetone 19:1 | 42.8 |
| 22 | do | 20.8 |
| 23 | do | 27.4 |
| 24 | chloroform-acetone 9:1 | 67.2 |
| 25 | do | 56.1 |
| 26 | do | 40.9 |
| 27 | chloroform-acetone 1:1 | 103.4 |
| 28 | do | 31.8 |
| 29 | do | 18.0 |
| 30 | acetone | 19.7 |
| 31 | do | 8.8 |
| 32 | do | 4.2 |
| 33 | acetone-methanol 1:1 | 34.2 |
| 34 | do | 12.3 |
| 35 | do | 6.5 |
| 36 | methanol | 7.4 |
| 37 | do | 2.5 |

Fractions 22 through 28, freed of solvent, were taken up in methylene chloride, slurried with 0.3 gram of Magnesol (magnesium silicate), filtered, evaporated to dryness, and crystallized from four milliliters of ethyl acetate. The resulting crystals were recrystallized from 0.5 milliliter of ethyl acetate to give 93.2 milligrams of 11-hydroxy-17α-methyltestosterone, having a melting point of 160 to 162 degrees centigrade, and an optical rotation $[\alpha]_D^{23}$ of plus 62 degrees (c. is 1.026 in chloroform).

Analysis:

Percent calculated for $C_{20}H_{30}O_3$ ---- C, 75.43; H, 9.50
Found ---- C, 75.59; H, 9.51
         C, 75.20; H, 9.54

PREPARATION 2.—10-NORMETHYL-11α-HYDROXY-17α-METHYLTESTOSTERONE-(11α,17β-DIHYDROXY-17α-METHYL-4-ESTRENE-3-ONE 4-estrene-3,17-dione [Marker and Rohrmann, J. Am. Chem. Soc., 62, 73 (1940)], which can also be prepared by the oxidation of 10-normethyltestosterone with chromium trioxide ($CrO_3$), is reacted with about four molar equivalents of anhydrous pyrrolidine in benzene at the boiling point of the reaction mixture in a flask fitted with a reflux condenser and a water trap so arranged that the condensed vapors pass through the water trap before returning to the reaction flask. After refluxing for about one hour, a catalytic amount of para-toluenesulfonic acid is added to the reaction mixture whereafter refluxing is continued until about one molar equivalent of water is collected in the water trap. Distillation of the reaction mixture to dryness leaves a residue of 3-(N-pyrrolidyl)-3,5-estradiene-17-one which is dissolved in anhydrous ether, reacted with a molar excess of methyl magnesium iodide, and thereafter the reaction mixture is treated with dilute hydrochloric acid, to produce 10-normethyl-17α-methyltestosterone. Washing the ether phase with water and thereafter distilling the dried ether solution to dryness leaves a residue of 10-normethyl-17α-methyltestosterone demonstrating marked androgenic activity.

In the same manner as described in Preparation 1, 10-normethyl-11α-hydroxy-17α-methyltestosterone is prepared from 10-normethyl-17α-methyltestosterone by subjecting the latter steroid to the oxygenating activity of *Rhizopus nigricans*. The resulting oxygenated steroid is isolated from the fermentation mixture in the same manner as described in Preparation 1 and purified 10-normethyl-11α-hydroxy-17α-methyltestosterone is obtained by crystallization of the reaction product from ethyl acetate.

*Example 1.—11-keto-17α-methyltestosterone*

A solution of 21.7 milligrams of chromium trioxide in two milliliters of ninety percent acetic acid was added dropwise to a solution of 90.5 milligrams of 11α - hydroxy - 17α - methyltestosterone in two milliliters of glacial acetic acid. After standing at room temperature during a period of five hours, the solution was diluted with ten milliliters of methanol and concentrated to a very small volume in vacuo. The residue was taken up with 25 milliliters of water and extracted with two fifty-milliliter portions of a mixture consisting of five parts of ether and one part of methylene dichloride. The extracts were washed twice with ten-milliliter portions of five percent sodium bicarbonate solution and four times with ten-milliliter portions of distilled water. After drying over anhydrous sodium sulfate, the ether was evaporated to give 88.8 milligrams of 11-keto-17α-methyl-testosterone. Upon two recrystallizations from aqueous methanol the product melted at 150–152 degrees centigrade. Its structure was confirmed by infrared analysis.

Analysis:

Percent calculated for
$C_{20}H_{28}O_3$ ------------------ C, 75.91; H, 8.92.
Found ------------------ C, 75.16; H, 9.08.

*Example 2.—11-keto-17α-methyltestosterone*

A solution of 11α-hydroxy-17α-methyltestosterone in benzene was agitated for 12 hours with an aqueous solution of sodium dichromate and sulfuric acid. The benzene layer was separated from the aqueous solution, washed with sodium bicarbonate solution and water, dried over anhydrous sodium sulfate, and evaporated to yield 11-keto-17α-methyltestosterone.

*Example 3. — 10-normethyl-11-keto-17α-methyltestosterone*

Oxidation of 10-normethyl-11α-hydroxy-17α-methyltestosterone, dissolved in glacial acetic acid, with an aqueous acetic acid solution of chromic acid anhydride at room temperature, in the manner given in Example 1 for the synthesis of 11-keto-17α-methyltestosterone, yielded 10-normethyl-11-keto-17α-methyltestosterone.

10-normethyl-11-keto-17α - methyltestosterone may also be obtained by oxidizing 10-normethyl-11α-hydroxy-17α-methyltestosterone, dissolved in methylene chloride, with a solution of alkali metal dichromate and aqueous sulfuric acid. The organic layer is separated from the aqueous acidic layer and the latter is extracted with methylene chloride. The combined methylene chloride extracts and the organic layer are evaporated in vacuo leaving crude 10-normethyl-11-keto-17α-methyltestosterone which may be purified by recrystallization from ethyl acetate, if desired.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. A 3,11-diketo-17β-hydroxy-17α-methyl steroid compound represented by the following formula:

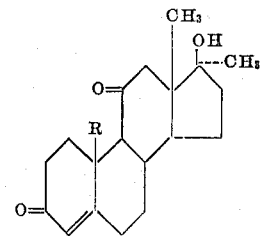

wherein R is selected from the group consisting of hydrogen and methyl.

2. 11-keto-17α-methyltestosterone.

3. 10 - normethyl-11-keto-17α-methyltestosterone.

4. In a process for the production of a compound selected from the group consisting of 11-keto-17α-methyltestosterone and 10-normethyl-11-keto-17α-methyltestosterone, the step of oxidizing with chromic acid a compound selected from the group consisting of 11α-hydroxy-17α-methyltestosterone and 10-normethyl-11α-hydroxy-17α-methyltestosterone to give the corresponding 11-keto-17α-methyltestosterone.

No references cited.